Oct. 3, 1961  F. BENJAMIN ET AL  3,003,101
REGULATED ALTERNATOR
Filed May 2, 1958  2 Sheets-Sheet 1
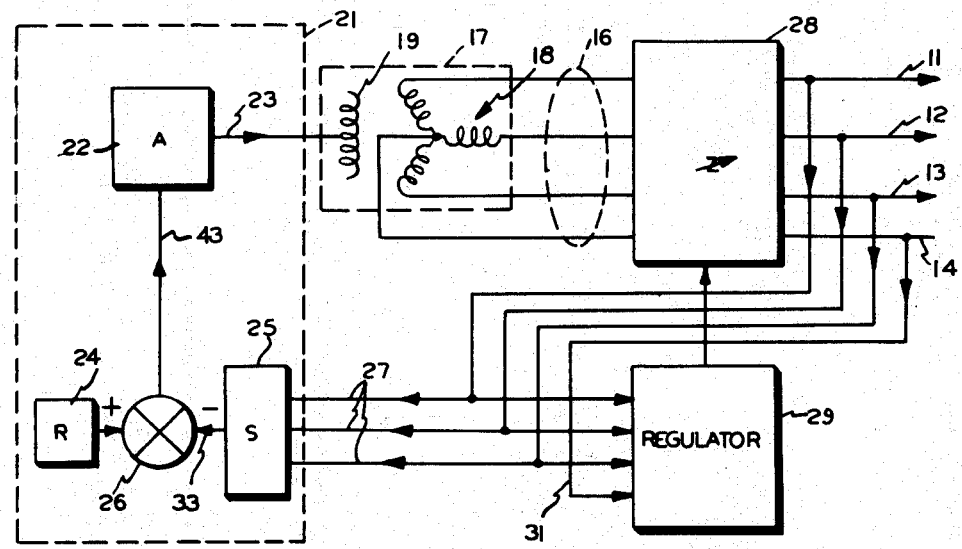
FIG.1
FIG.6
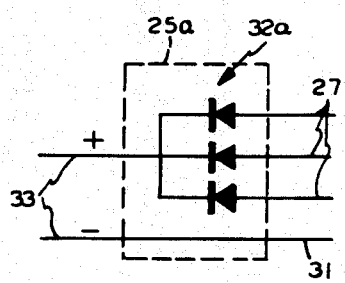
FIG.2
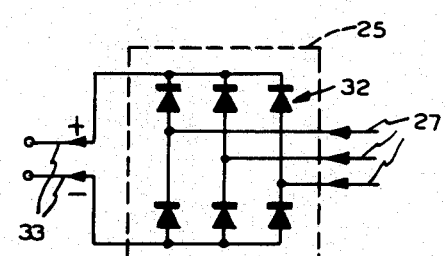
FIG.5
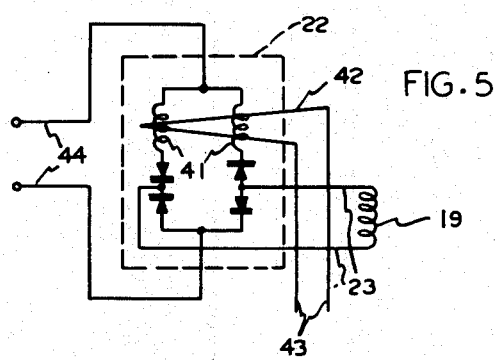
INVENTORS
FRED BENJAMIN
ARTHUR D. SCHOENFELD
BY Warren T. Jessup
ATTORNEY Oct. 3, 1961  F. BENJAMIN ET AL  3,003,101
REGULATED ALTERNATOR
Filed May 2, 1958  2 Sheets-Sheet 2
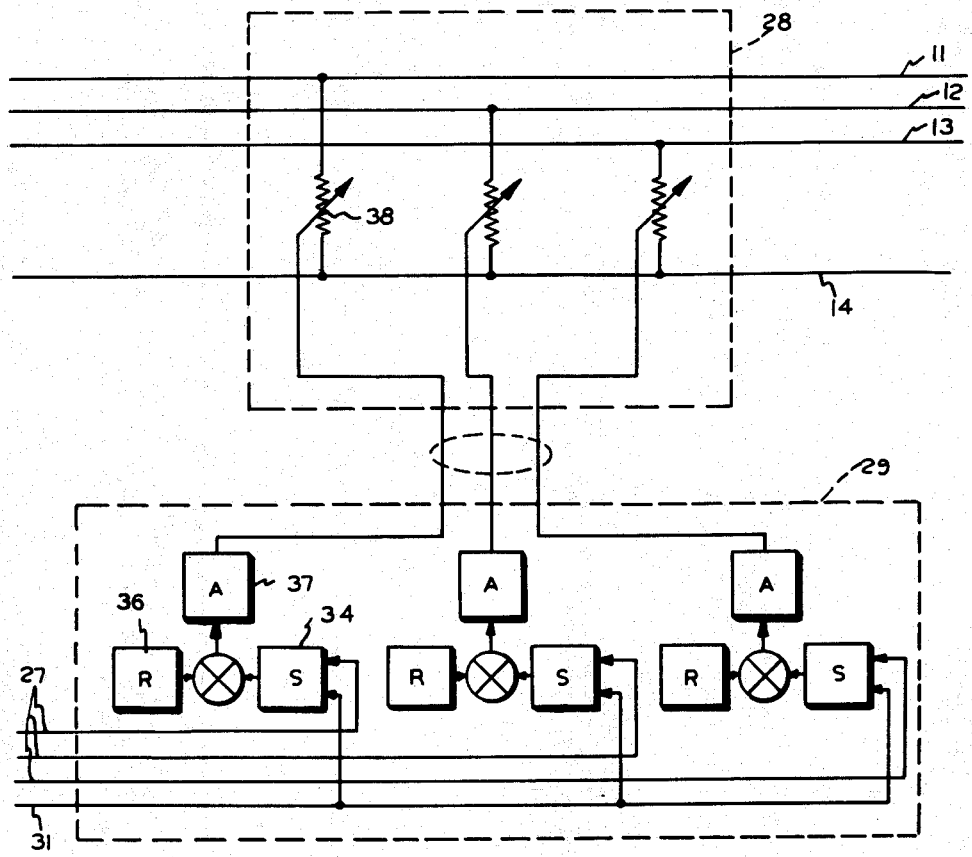
FIG. 3
FIG. 4
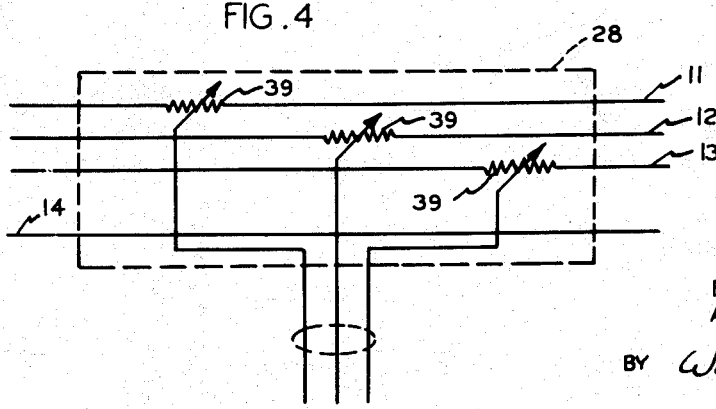
INVENTORS
FRED BENJAMIN
ARTHUR D. SCHOENFELD
BY Warren T. Jessup
ATTORNEY

3,003,101
REGULATED ALTERNATOR

Fred Benjamin, La Mirada, and Arthur D. Schoenfeld, Covina, Calif., assignors to American Electronics, Inc., Los Angeles, Calif., a corporation of California
Filed May 2, 1958, Ser. No. 732,608
5 Claims. (Cl. 322—97)

This invention relates to regulators, and more particularly to a voltage regulating system for an alternating current generator or alternator, and particularly a multi-phase alternator. By way of example, the invention will be described as applied to a three-phase alternator.

It is known in the art to place line voltage regulators in a three-phase bus at the output of an alternator for the purpose of regulating the line voltage with variation in load. Such regulators often take the form of adjustable impedances or resistances placed either in series in each of the phases of the line, or in shunt between phases or between each phase and the neutral. Such line regulators serve to maintain line voltages substantially at the proper level and also tend to eliminate imbalance in and among line voltages due to imbalance in load on the three phases. They have the serious disadvantage, however, that they inherently introduce sever harmonic distortion; and it is an object of this invention to provide alternator voltage regulation which does not introduce severe or even objectionable harmonic distortion into the line.

Where severe variations in load on the three-phase line must be anticipated, it has been necessary to make the line regulators, i.e., the three adjustable impedances, of sufficient size and magnitude to accommodate the maximum span between light loading and heavy loading. It is accordingly another object of this invention to provide a voltage regulating system having appreciably smaller weight and bulk and consequent smaller cost than previous systems. It is another object to provide a voltage regulation system which will increase alternator longevity. It is a further object to provide a system having better regulation than heretofore.

In a three-phase system having no regulator, an imbalance in load among the three phases produces an imbalance in line voltages as well as an over-all drop in average or mean line voltage. In the past it has been customary, where justified economically, to employ line regulation for not only regulating the over-all or average voltage among the phases, but also to balance the three phases. One regulator per phase is required, so that in the case of a three-phase system three such regulators would be required. Several different types of line regulators are known in the art, one type of regulator, known as the ferro-resonant type, or constant voltage transformer, is simple and economical, but its use is restricted to applications where only the input voltage varies. For satisfactory operation the input frequency and the load on the output must be fixed. This regulator consists generally of a partially saturating transformer across the output or secondary of which is connected a capacitor.

Another common type of line regulator is the series type, wherein a variable impedance is interposed in series in the line or bus at the output of the alternator and the magnitude of the impedance or resistance is continuously and automatically varied in accordance with the line voltage. To this end the line voltage is sensed and compared with a stable reference voltage. The difference is applied through an amplifier to the variable impedance, so as to continually adjust its value to maintain the output voltage as stable as possible.

In similar vein, line regulators are used in shunt with the phases of the bus, generally being connected between the respective three phases and the neutral line of a three-phase system. These impedances are likewise controlled by sensing the output voltage and varying the impedance in such a way as to continuously maintain the output voltage as stable as possible.

As noted hereinbefore, line regulation corrects not only for imbalance among phases, but also corrects for the over-all voltage drop which occurs when the system is loaded. However, it introduces severe harmonic distortion, and in addition is quite costly because of the large size of the reactors or impedances which must be employed to compensate for the wide variation in line voltage with wide variation in loading.

Where the expense of line regulation is not justified, it has been customary to employ field regulation. In these systems the output voltage or voltages are sensed, applied against a reference standard, and the difference employed to control an amplifier which in turn feeds the alternator field. Field regulation of this type serves to offset and compensate for loading on an average or over-all basis or for one particular phase, but is unable to cope with phase imbalance, since all phases must be adjusted equally. Thus, while it corrects the average or mean voltage among the phases, or one particular phase, it does not help with phase imbalance, and therefore some phases may be well over the rated voltage while others may be seriously under the rated voltage.

As noted hereinbefore, line regulation, except for the objectionable phase distortion, has been recognized as being suitable for correction of both phase imbalance and general voltage fluctuation, although the cost has been high because of the large size of regulators required. Field regulation has been turned to in those instances where the expense of the costly line regulation was not justified. No thought has even been given to combining the two types of regulation, primarily for two reasons. First, it has been felt that field regulation is simply a less desirable but more economical form of regulation than line regulation and that line regulation by itself accomplishes essentially everything required; and, secondly, it has been tacitly assumed that the two types of regulation would be implicitly incompatible, since the line regulation implicity has a capacity for bringing up the entire line voltage, which is essentially the function of the field regulation, and it has in the past been tacitly assumed that any attempt to combine the two types of regulation would lead to instability, in that each regulator would attempt to take over or control the general or average line voltage.

However, in accordance with the present invention, both types of regulation, line regulation and field regulation, are employed to regulate the alternator output and unexpected synergistic advantages have resulted.

In the first place, it has been found that by simultaneously applying both types of regulation to the alternator and its output line, harmonic distortion has been reduced almost to insignificance. It has been further found that with the present invention the large bulky line regulators which would normally have to be employed for a given size system, may be measurably reduced in size from what would be required if field regulation were not simultaneously used. The net result is that although the field regulator must be slightly larger than would otherwise be the case without line regulation, the decrease in size of the line regulators is so much more marked that the total bulk, weight and cost of the entire regulation system is much less than would be required with conventional regulation equipment to achieve the same extent of regulation. In other words, it has been found that line and field regulation are not linear functions and that therefore the combination of the two produces far more than merely the expected sum of the two when used individually.

Specific schematic forms of the present invention are illustrated in the accompanying drawings, wherein:

FIG. 1 shows schematically a system constructed in accordance with the present invention;

FIG. 2 is a more detailed schematic diagram of one of the components illustrated in FIG. 1;

FIG. 3 is a further detailed schematic diagram of certain other components shown in FIG. 1;

FIG. 4 illustrated an alternative construction of one of the elements or components shown in FIG. 3; and FIG. 5 is a representative example of the nature of one of the other elements or components shown in FIG. 1.

FIG. 6 shows an alternative form of the component illustrated in FIG. 2.

Referring to the drawings, and particularly to FIG. 1, there is illustrated a regulated multi-phase electric system, particularly a three-phase system, having three output wires 11, 12 and 13, and a neutral or return wire 14, which together constitute a three-phase output bus 16. Feeding power to the bus 16 is a three-phase alternator 17, having, in the example shown, a Y-connected armature 18 and a field winding 19.

Field current is applied to the field winding 19 by field current means shown schematically at 21 and consisting essentially of an amplifier 22, the output of which is applied to the field winding 19 as shown at 23. The output of the amplifier 22 is regulated in accordance with the difference between a reference voltage from a standard 24 and a sensed voltage from 25, which are combined at 26 and fed to the amplifier 22. The sensing mechanism 25 has voltages from the three phases 11, 12 and 13 fed to it by means of sensing leads or wires 27. If desired, sensing could be confined to a single phase, or alternatively could incorporate the neutral 31, as shown in FIG. 6.

The regulating system of the present invention also includes an adjustable impedance means 28 connected to the bus 16 and regulated by a regulating means 29 to which is also applied the three-phase voltages from the leads 27, and in some instances the neutral or return lead 31. Here again, sensing of a single phase could be employed.

The adjustable impedance means 28 and its control or regulator 29 may take one of a number of known forms as hereinbefore described, such as series, or shunt, or variations thereof, such as buck-boost. Likewise the field regulation for the field winding 19 may take any suitable and known form, such as is shown by way of example on page 419 of the book entitled "Magnetic Amplifiers," by H. F. Storm, published by John Wiley & Sons.

For field regulation, the voltage between any one of the phases 11–13 and the neutral 14 may be applied to the sensing means 25 and used to control the current in the field winding 19, or an average or mean of all three phase voltages may be taken, as shown by the exemplary sensing means 25 in FIG. 2. In FIG. 2 the leads from the three phases 27 are applied to the matrix of rectifiers 32 and an average is then applied to the output leads 33, feeding to the comparator 26. This average is then compared in 26 with the standard stable reference voltage 24, and the difference is employed to drive the amplifier 22.

An alternative sensing means 25a is shown in FIG. 6 wherein the three phases 27 are half-wave rectified by the diode matrix 32a and combined to form the positive output. The neutral 31 passes through as the negative output.

The regulator 29 and impedance means 28 may take the form shown in FIG. 3 if desired. In this figure the respective voltages between each of the phases 27 and the neutral 31 are applied to a sensing means 34 and thence compared with a standard reference voltage from 36, the difference being applied to an amplifier 37, the output of which serves to adjust or regulate the magnitude of an adjustable impedance 38 connected in shunt across the associated phase, for example the phase 11, and the neutral 14. Under some conditions the amplifier 37 is unnecessary. This system is a typical shunt line regulator system and functions in manner well known.

Where series rather than shunt regulation is desired for the line the impedance means may take the form shown in FIG. 4, wherein impedances 39 are connected in series in each of the respective phases 11, 12 and 13, the magnitudes, as before, being controlled by the voltages of their respective leads or phases.

The amplifiers, for example the amplifier 22 shown in FIG. 1, may take the form of a magnetic amplifier (FIG. 5) having gate windings 41 and a control winding 42 fed from the leads 43. The amplifier is supplied with a source of power at 44 and the output applied to the leads 23 and thence to the field winding 19.

A system constructed in accordance with the present invention has been tested meticulously and found to have marked advantages over systems previously known. The following table shows the results of a test of a system having line regulation only.

| Test No. | P.F. Lag | Load Current | | | Base Voltage | | |
|---|---|---|---|---|---|---|---|
| | | $\phi A$ | $\phi B$ | $\phi C$ | $\phi A$ | $\phi B$ | $\phi C$ |
| 1 | | NL | NL | NL | 115 | 115 | 115 |
| 2 | 1.0 | FL | FL | FL | 114.7 | 114.7 | 114.8 |
| 3 | 0.8 | FL | FL | FL | 115 | 114.9 | 114.8 |
| 4 | 0.75 | FL | FL | FL | 112.3 | 112.5 | 112.1 |
| 5 | 1.0 | NL | NL | Fl | 114.4 | 115.8 | 114.3 |
| 6 | 0.8 | NL | NL | FL | 116 | 116.5 | 114.4 |
| 7 | 0.75 | NL | NL | FL | 113.3 | 114.5 | 111.8 |
| 8 | 1.0 | NL | FL | FL | 114.9 | 114.9 | 113.5 |
| 9 | 0.8 | NL | FL | FL | 117 | 115.2 | 114.8 |
| 10 | 0.75 | NL | FL | FL | 114 | 113 | 111.5 |

| Test No. | Reactor Current | | | L-N Total Distortion | | |
|---|---|---|---|---|---|---|
| | $\phi A$ | $\phi B$ | $\phi C$ | $\phi A$ | $\phi B$ | $\phi C$ |
| 1 | 85 | 82 | 88.0 | 11.9 | 13.0 | 11.7 |
| 2 | 49 | 48 | 50.0 | 1.83 | 1.62 | 1.4 |
| 3 | 8.8 | 13.0 | 16.5 | 1.02 | 1.0 | .98 |
| 4 | 19 | 17 | 24 | 1.2 | 1.1 | 1.12 |
| 5 | 40 | 85 | 50 | 1.5 | 3.0 | 1.37 |
| 6 | 32.5 | 75 | 6.8 | 1.5 | 2.4 | 1.84 |
| 7 | 52 | 82 | 33 | 1.9 | 2.99 | 1.86 |
| 8 | 65 | 75 | 27.5 | 2.5 | 2.67 | 2.32 |
| 9 | 43.8 | 30.0 | 3.0 | 3.2 | 1.5 | 2.75 |
| 10 | 68 | 34 | 13.5 | 3.7 | 1.48 | 2.05 |

The following table shows the result when field regulation as well as line regulation is employed, in accordance with the present invention.

| Test No. | P.F. | Load Current | | | Phase Voltage | | | L-L Voltage | | |
|---|---|---|---|---|---|---|---|---|---|---|
| | | $\phi A$ | $\phi B$ | $\phi C$ | $\phi A$ | $\phi B$ | $\phi C$ | A1-2 | A2-1 | A3-1 |
| 1 | | NL | NL | NL | 115 | 115 | 115 | 200.8 | 200.7 | 200.6 |
| 2 | 1.0 | FL | FL | FL | 114.9 | 115 | 114.9 | 200.6 | 200.0 | 199.8 |
| 3 | 0.8 lag | FL | FL | FL | 114.8 | 114.6 | 114.9 | 199.5 | 200 | 200 |
| 4 | 1.0 | NL | NL | FL | 113.6 | 116.4 | 114.8 | 201 | 204 | 196.8 |
| 5 | 0.8 lag | NL | NL | FL | 115 | 116.3 | 113.9 | 202.2 | 202 | 197.8 |
| 6 | 0.8 lead | NL | NL | FL | 112 | 115.7 | 115.7 | 198 | 205 | 196.2 |
| 7 | 1.0 | NL | FL | FL | 114.9 | 116 | 113 | 205 | 199.5 | 197 |
| 8 | 0.8 lag | NL | FL | FL | 116 | 114.7 | 112.5 | 201.2 | 197.0 | 198.8 |

| Test No. | Alt. Field Current | Reactor Current | | | Regulator Output | | | L-N Distortion | | |
|---|---|---|---|---|---|---|---|---|---|---|
| | | φA | φB | φC | φA | φB | φC | φA | φB | φC |
| 1 | 15.1 | 26.5 | 24 | 27.0 | 2.0 | 1.9 | 2.0 | 1.22 | 1.15 | 1.04 |
| 2 | 15.4 | 16.0 | 16.0 | 17.0 | 1.45 | 1.15 | 1.5 | .96 | .87 | .85 |
| 3 | 19.6 | 24.5 | 24.0 | 22.0 | 2.4 | 2.3 | 3.0 | 1.30 | 1.21 | 1.03 |
| 4 | 14.6 | 6.0 | 31 | 2.7 | .25 | 2.8 | .3 | 1.35 | 2.9 | 1.1 |
| 5 | 16.3 | 25.0 | 57.0 | 5.5 | 2.15 | 5.3 | .2 | 1.25 | 3.4 | 2.25 |
| 6 | 13.5 | 9.0 | 17 | 20 | .25 | 2.8 | .3 | 1.54 | 1.78 | 1.86 |
| 7 | 15.1 | 16 | 28 | 9.5 | 1.52 | 2.5 | .2 | 1.35 | 2.1 | 1.55 |
| 8 | 17.4 | 44.0 | 22.5 | 8.5 | 4.0 | 2.0 | .2 | 3.25 | 1.32 | 2.2 |

From the above the many advantages of the present invention will be noted. First it will be noted that the distortion, i.e., the harmonic distortion, has been markedly reduced. This is because the present invention draws much less current through the dummy load (i.e. the impedances 38 in FIG. 3) than does the conventional line regulation system without field regulation.

Secondly, it will be noted that the size of the dummy load (saturable reactor, 38 in FIG. 3) may be greatly reduced, because the size is determined principally by the largest current which it must pass. It will be seen from the last table above cited, giving the results of the present invention, that the largest current under any condition, this being an 80 lagging power factor on the second and third phase, was 44 amps., whereas the largest current drawn with the standard line regulator alone was 88 amps., this being under no load conditions.

Thirdly, the overall regulation is immeasurably better because of the much smaller swing between maximum and mnimum reactor current, i.e., current in the adjustable impedance 38 (FIG. 3).

Finally, alternator life may be expected to be much improved with the present invention because the life expectancy of the field coils of an alternator varies inversely with the field current time duration. In the first two tables the field current remained constant at 18 amps., whereas with the present invention it will be seen that the field current was varied from 13.5 to 19.6 amps. with the general mean or average being appreciably less than the constant 18 amps. without the present invention.

While the instant invention has been shown and described herein in what is conceived to be the most practical and preferred embodiments, it is recognized that departures may be made therefrom within the scope of the invention which is therefore not to be limited to the details disclosed herein but is to be afforded the full scope of the claims.

What is claimed is:

1. Regulated multi-phase electric system comprising: a multi-phase alternator having a field winding; a multi-phase output bus connected to the output of said alternator; means for applying field current to said field winding; means responsive to energy flow in a least one phase of said output bus for regulating the field current applied to said field in accordance with said energy flow; adjustable impedance means interposed in each phase of said output bus; and regulating means connected to at least one phase of said output bus for regulating the magnitude of said impedance means in accordance with energy flow in said last mentioned phase.

2. Regulated three phase electric system comprising a three phase alternator having a field winding, an output bus connected to the output terminals of said alternator, means for applying field current to said field winding, electric means for applying the voltage of at least one phase of the alternator output to said field current applying means for controlling said field current in accordance with said phase voltage, adjustable impedance means connected to said output bus, and means responsive to the output voltage of at least one phase of said alternator for controlling the value of said impedance means in accordance with said output voltage.

3. Regulated multi-phase electric system comprising: a multi-phase alternator having a field winding, a multi-phase output bus connected to the output of said alternator, means for applying field current to said field winding, means responsive to energy flow in at least one phase of said output bus for regulating the field current applied to said field in accordance with said energy flow, adjustable impedance means connected across each phase of said output bus, and regulating means connected to at least one phase of said output bus for regulating the magnitude of said impedance means in accordance with energy flow in said last mentioned phase.

4. Regulated multi-phase electric system comprising: a multi-phase alternator having a field winding, a multi-phase output bus connected to the output of said alternator, means for applying field current to said field winding, means responsive to energy flow in at least one phase of said output bus for regulating the field current applied to said field in accordance with said energy flow, adjustable reactor means interposed in each phase of said output bus and regulated means connected to at least one phase of said output bus for regulating the magnitude of said reactor means in accordance wtih energy flow in said last mentioned phase.

5. Regulated multi-phase electric system comprising: a multi-phase alternator having a field winding, a multi-phase output bus connected to the output of said alternator, means for applying field current to said field winding, means responsive to energy flow in at least one phase of said output bus for regulating the field current applied to said field in accordance with said energy flow, adjustable reactor means connected across each phase of said output bus, and regulating means connected to at least one phase of said output bus for regulating the magnitude of said reactor means in accordance with energy flow in said last mentioned phase.

References Cited in the file of this patent

UNITED STATES PATENTS

| | | |
|---|---|---|
| 903,580 | Knapp et al. | Nov. 10, 1908 |
| 1,126,620 | Creveling | Jan. 26, 1915 |
| 2,333,617 | Smith | Nov. 2, 1943 |
| 2,758,272 | Franklin | Aug. 7, 1956 |
| 2,806,990 | Evans | Sept. 17, 1957 |